(12) United States Patent
Nishida

(10) Patent No.: US 10,855,871 B2
(45) Date of Patent: Dec. 1, 2020

(54) IMAGE READING APPARATUS, METHOD OF CONTROLLING IMAGE READING APPARATUS, AND STORAGE MEDIUM

(71) Applicant: CANON KABUSHIKI KAISHA, Tokyo (JP)

(72) Inventor: Tomofumi Nishida, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/508,791

(22) Filed: Jul. 11, 2019

(65) Prior Publication Data

US 2020/0045201 A1 Feb. 6, 2020

(30) Foreign Application Priority Data

Aug. 1, 2018 (JP) .................. 2018-145422

(51) Int. Cl.
*H04N 1/00* (2006.01)
*H04N 1/047* (2006.01)

(52) U.S. Cl.
CPC ......... *H04N 1/047* (2013.01); *H04N 1/00037* (2013.01); *H04N 1/00076* (2013.01); *H04N 2201/0096* (2013.01)

(58) Field of Classification Search
CPC ....... H04N 2201/0072; H04N 1/00912; H04N 1/0096; H04N 1/32609; H04N 1/32635; H04N 1/32657; H04N 5/23241; H04N 1/00307; H04N 1/00315; H04N 1/00588; H04N 1/00663; H04N 1/121; H04N 1/32625; H04N 1/3263; H04N 1/32662; H04N 21/436; H04N 2201/0055; H04N 2201/0081; H04N 2201/3278; H04N 2201/3284; H04N 5/2254; H04N 5/23203; H04N 5/23209; H04N 5/23293;

(Continued)

(56) References Cited

U.S. PATENT DOCUMENTS 4,823,195 A * 4/1989 Ito .................... H04N 1/128
358/296
5,181,104 A * 1/1993 Sugishima ............ H04N 1/047
358/453

(Continued)

FOREIGN PATENT DOCUMENTS

JP 2007-013702 1/2007

*Primary Examiner* — Negussie Worku
(74) *Attorney, Agent, or Firm* — Venable LLP

(57) ABSTRACT

Provided is an image reading apparatus includes a sensor capable of reading a document and a fixing member capable of restricting movement of the sensor on a basis of a user operation, the apparatus comprising: a control unit configured to perform predetermined control to move the sensor; a detection unit configured to detect a moving distance of the sensor by the predetermined control; a determination unit configured to execute a determination process of determining, on a basis of the detected moving distance of the sensor by the predetermined control, whether movement of the sensor is restricted by the fixing member; and a notification unit configured to execute a notification process of notifying a user that movement of the sensor is restricted by the fixing member, in a case where the determination unit determines that movement of the sensor is restricted by the fixing member.

20 Claims, 8 Drawing Sheets

(58) Field of Classification Search
CPC .... H04N 5/2353; H04N 5/357; H04N 13/128; H04N 13/167; H04N 1/00127; H04N 1/00132; H04N 1/00137; H04N 1/00167; H04N 1/0035; H04N 1/00384; H04N 1/00408; H04N 1/00411; H04N 1/00413; H04N 1/00416; H04N 1/00424; H04N 1/00432; H04N 1/00474; H04N 1/00477; H04N 1/00517; H04N 1/00915; H04N 1/107; H04N 1/32667; H04N 2013/0081; H04N 2201/0053; H04N 2201/0077; H04N 2201/3287; H04N 5/2258; H04N 5/23212; H04N 5/23229; H04N 5/23238; H04N 5/23245; H04N 5/232941; H04N 5/247; H04N 7/181
USPC .................................. 358/474, 496, 497, 448
See application file for complete search history.

(56) References Cited

U.S. PATENT DOCUMENTS

| | | | |
|---|---|---|---|
| 6,765,700 B1* | 7/2004 | Naito | H04N 1/00795 358/406 |
| 2003/0090742 A1* | 5/2003 | Fukuda | H04N 1/04 358/448 |
| 2003/0174369 A1* | 9/2003 | Sato | H04N 1/40056 358/509 |
| 2003/0231355 A1* | 12/2003 | Ishikawa | H04N 1/00204 358/474 |
| 2004/0160648 A1* | 8/2004 | Ishizuka | H04N 1/0414 358/486 |
| 2008/0117481 A1* | 5/2008 | Akiyama | H04N 1/0473 358/488 |
| 2010/0231983 A1* | 9/2010 | Nozaki | H04N 1/0473 358/426.01 |
| 2012/0162727 A1* | 6/2012 | Shimoda | H04N 1/02481 358/475 |
| 2013/0128022 A1* | 5/2013 | Bose | G06K 9/00342 348/77 |
| 2014/0343419 A1* | 11/2014 | Sako | A61B 8/5292 600/437 |
| 2016/0057301 A1* | 2/2016 | Motoyama | H04N 1/3263 358/406 |
| 2016/0277397 A1* | 9/2016 | Watanabe | G06K 9/00906 |
| 2018/0097954 A1 | 4/2018 | Hachiro et al. | H04N 1/00774 |
| 2018/0146106 A1* | 5/2018 | Fujinaga | H04N 1/00737 |
| 2018/0324315 A1* | 11/2018 | Takamori | H04N 1/1065 |
| 2019/0114024 A1* | 4/2019 | Yu | G06F 3/0414 |
| 2019/0302986 A1* | 10/2019 | Iwasa | H04N 5/232945 |

* cited by examiner

DIRECTION OF MOVEMENT OF CIS UNIT DURING SCAN OPERATION →

DIRECTION OF MOVEMENT OF CIS UNIT DURING SCAN OPERATION →

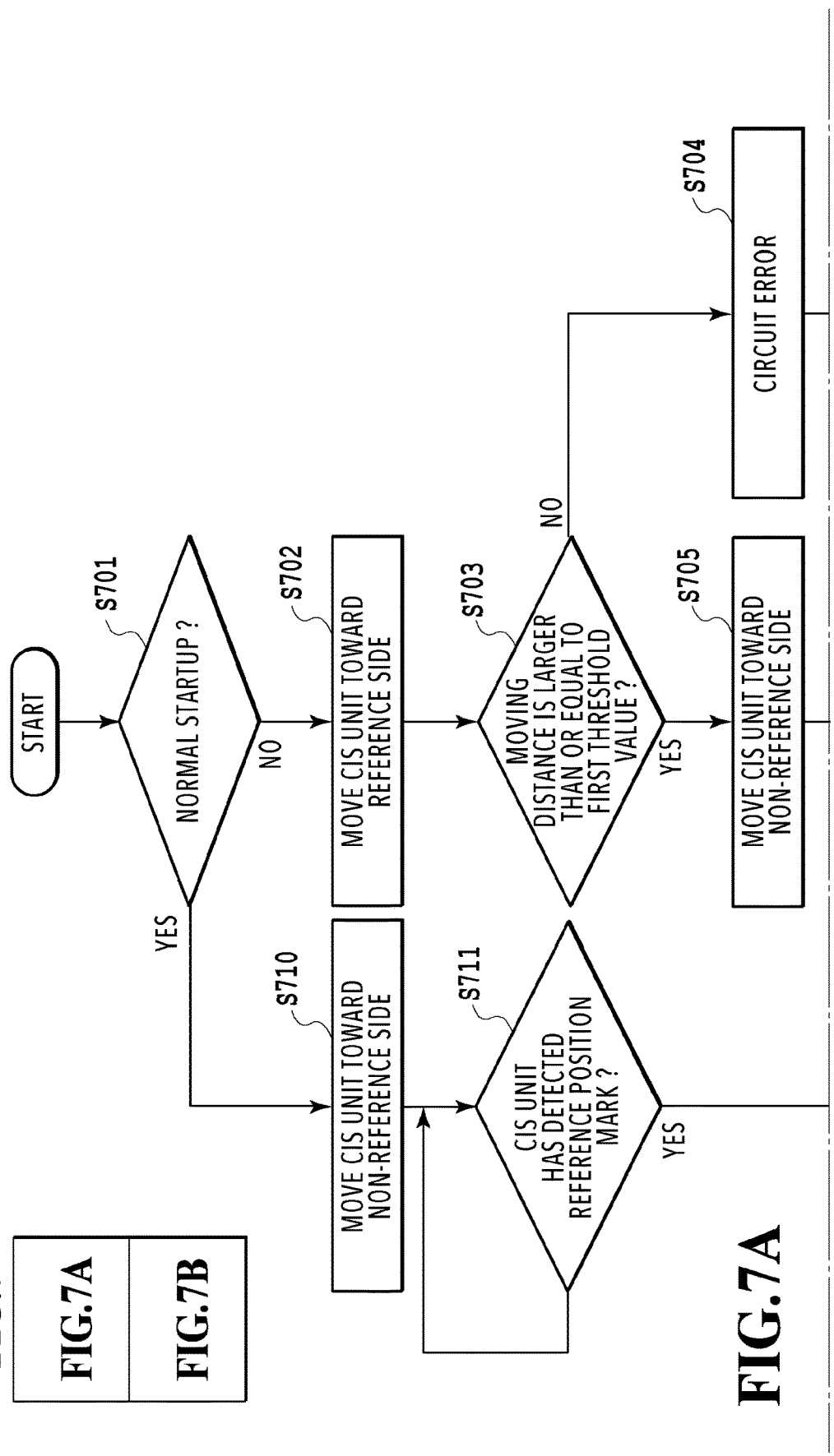

IMAGE READING APPARATUS, METHOD OF CONTROLLING IMAGE READING APPARATUS, AND STORAGE MEDIUM

BACKGROUND OF THE INVENTION

Field of the Invention

The present invention relates to an image reading apparatus, a method of controlling an image reading apparatus, and a storage medium.

Description of the Related Art

An image reading apparatus reads a document placed on a document platen by moving a sensor unit inside a housing. Here, if the image reading apparatus is shaken or dropped while the apparatus is transported, the accuracy of assembly of the sensor unit may be deteriorated, thus making it impossible to properly read a document. For this reason, the image reading apparatus is provided with a lock member that fixes the sensor unit to prevent the sensor unit from being moved or shaken more than necessary during the transport or the like. However, if the user instructs the image reading apparatus to read a document without unfixing the sensor unit from the lock member, the image reading apparatus will not be able to properly read the document.

Japanese Patent Laid-Open No. 2007-13702 proposes a method involving installing a photosensor inside the housing of an image reading apparatus, determining whether its sensor unit is fixed by a lock member and therefore unable to move on the basis of a detection signal from the photosensor and, if so, notifying the user of an error.

Meanwhile, with the spread of image reading apparatuses that read a document by moving a sensor unit, there has been an increasing demand for higher convenience for notification of an error related to the sensor unit.

SUMMARY OF THE INVENTION

An image reading apparatus includes a sensor capable of reading a document on a document platen and a fixing member capable of restricting movement of the sensor on a basis of a user operation, the image reading apparatus comprising: a control unit configured to perform predetermined control to move the sensor; a detection unit configured to detect a moving distance of the sensor by the predetermined control; a determination unit configured to execute a determination process of determining, on a basis of the detected moving distance of the sensor by the predetermined control, whether movement of the sensor is restricted by the fixing member; and a notification unit configured to execute a notification process of notifying a user that movement of the sensor is restricted by the fixing member, in a case where the determination unit determines that movement of the sensor is restricted by the fixing member.

Further features of the present invention will become apparent from the following description of exemplary embodiments with reference to the attached drawings.

BRIEF DESCRIPTION OF THE DRAWINGS

FIG. 7 is a diagram showing the relationship of FIG. 7A and FIG. 7B;

FIG. 7A is a flowchart illustrating a process of determining whether an error is occurring with a CIS unit in a third embodiment.

DESCRIPTION OF THE EMBODIMENTS

Embodiments of the present invention will be described below in detail. Note that the constituent elements described in the following embodiments merely represent exemplary modes of the present invention and do not limit the scope of the present invention only to those.

First Embodiment

Figure 1A:
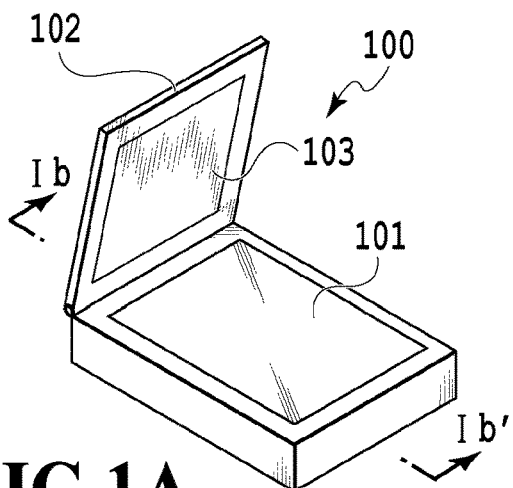
FIGS. 1A to 1C are diagrams for explaining an image reading apparatus in a first embodiment.
Figure 1B:
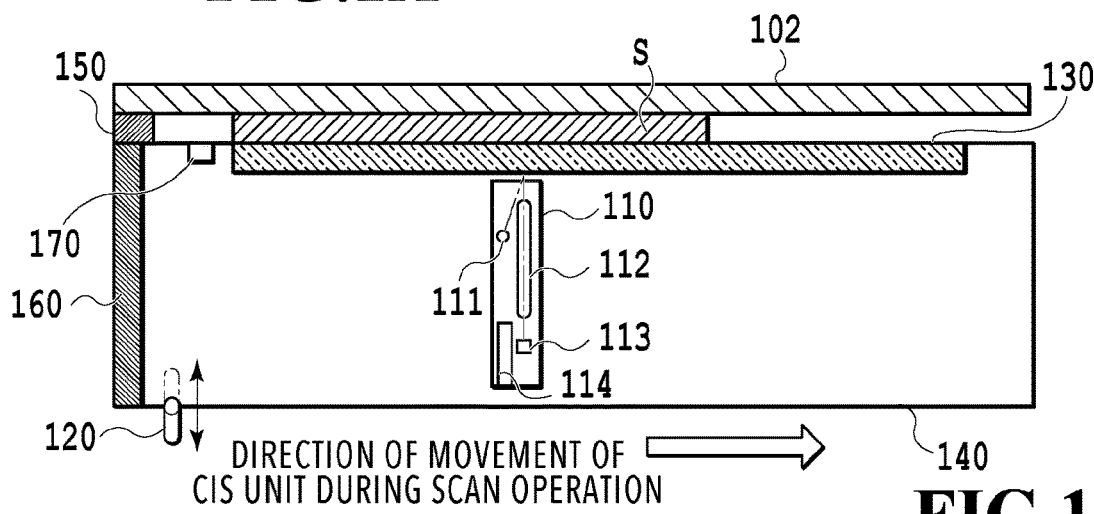
Figure 1C:
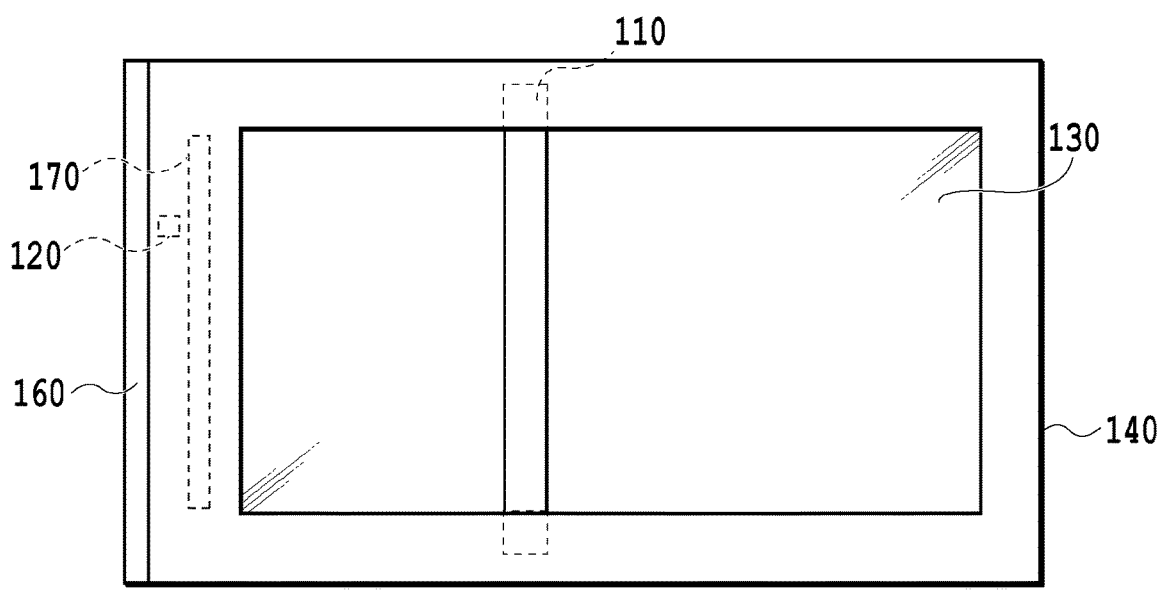

FIGS. 1A to 1C are diagrams for explaining an image reading apparatus in a first embodiment. FIG. 1A illustrates a diagram of the exterior of an image reading apparatus 100 in the first embodiment. The image reading apparatus 100 in the present embodiment is a single-function scanner (SFS), for example. Note that the image reading apparatus 100 is not limited to an SFS but may be a multi-function scanner (MFS) having a printing function, a photocopying function, an E-mail function, and so on as well as a scanning function.

As illustrated in FIG. 1A, the image reading apparatus 100 comprises a document platen 101, a document platen cover 102, and a sheet 103. The document platen 101 is where the user places a document. The document platen cover 102 is a pressure plate that presses the document placed on the document platen 101 to hold the document on the document platen 101. The document platen cover 102 has functions such as reducing the effect of external light. The sheet 103 is a white sheet attached to the document platen cover 102 so that non-document regions can be read as a white image.

FIG. 1B is a diagram schematically illustrating a cross section Ib-Ib' of the image reading apparatus 100. The image reading apparatus 100 comprises a contact image sensor (CIS) unit 110 that optically reads a document placed on the document platen 101, a lock member 120, a contact glass 130, a frame 140, and a hinge 150. The image reading apparatus 100 comprises a mechanism (not illustrated) that moves the CIS unit 110 in a horizontal direction (right-left direction in FIG. 1B). The CIS unit 110 is a sensor unit including a light emitting unit 111, a rod lens array 112, an image sensor array 113, and a lock receiving hole 114. The contact glass 130 is provided to maintain a certain distance between the scanner sensor and a document S, as illustrated in FIG. 1B. The document platen cover 102 can be lifted upward (toward the upper side in FIG. 1B) with the hinge 150 serving as a fulcrum, which is installed on the document platen 101. The user lifts up the document platen cover 102 and sets the document S onto the document platen 101. The light emitting unit 111 includes a light source (LED in the present embodiment) and a light guide, and converts light emitted from the light source into linear light through the light guide and irradiates the document S with the linear light. The rod lens array 112 guides the light reflected by the document S to the image sensor array 113. The image sensor array 113 generates an image signal by photoelectric conversion. The frame 140 is the housing of the image reading apparatus 100. A reference position mark 170 is formed at a position used as a reference in obtaining the position of the document S on the document platen 101 in the sub scanning direction. A reference-side sidewall 160 is the sidewall of the frame 140 on a reference side (the left side in FIG. 1B in the present embodiment). The position of the reference-side sidewall 160 is used as a reference in obtaining the position of the CIS unit 110 in the sub scanning direction. The lock member 120 is a member (fixing member) that fixes the CIS unit 110 and is installed on the path of movement of the CIS unit 110. In the present embodiment, the CIS unit 110 is fixed by inserting the lock member 120 into the lock receiving hole 114 of the CIS unit 110. Note that in the present embodiment, the lock member 120 is installed such that the lock member 120 can be inserted into the lock receiving hole 114 in a state where the CIS unit 110 is located at a position away from its home position by a predetermined distance in the sub scanning direction. Meanwhile, in the present embodiment, while the CIS unit 110 is fixed by the lock member 120, its movement is not completely restricted but the CIS unit 110 is movable slightly in the main scanning direction and the sub scanning direction. However, the configuration may be such that movement of the CIS unit 110 is completely restricted while the CIS unit 110 is fixed by the lock member 120. In other words, the lock member 120 is a member capable of restricting movement of the CIS unit 110 in response to a user operation, or the CIS unit 110 can be in a state where its movement is restricted by the lock member 120 and a state where its movement is not restricted by the lock member 120. Here, the home position refers to a position at which the CIS unit 110 is located during standby for operation of the image reading apparatus 100. In the present embodiment, the home position of the CIS unit 110 is a position at which the left side surface of the CIS unit 110 (the left side surface in FIG. 1B) abuts the reference-side sidewall 160.

FIG. 1C schematically illustrates a state of the image reading apparatus 100 as viewed from above. Note that the document platen cover 102 is omitted in FIG. 1C for simple illustration. In FIG. 1C, the CIS unit 110 is at a position away from the home position since FIG. 1C illustrates a state where the image reading apparatus 100 is executing a scan operation. The image sensor array 113 of the CIS unit 110 is formed of a plurality of sensors that, upon receiving light, performs photoelectric conversion on the incident light and outputs a current. The sensors are arranged in a one-dimensional array. In the present embodiment, the direction in the sensors are arrayed is designated as the main scanning direction of a scan operation. An output (current) is obtained from each individual sensor of the image sensor array 113 in the order in which the sensors are arranged, and the output undergoes A/D conversion.

Figure 2:
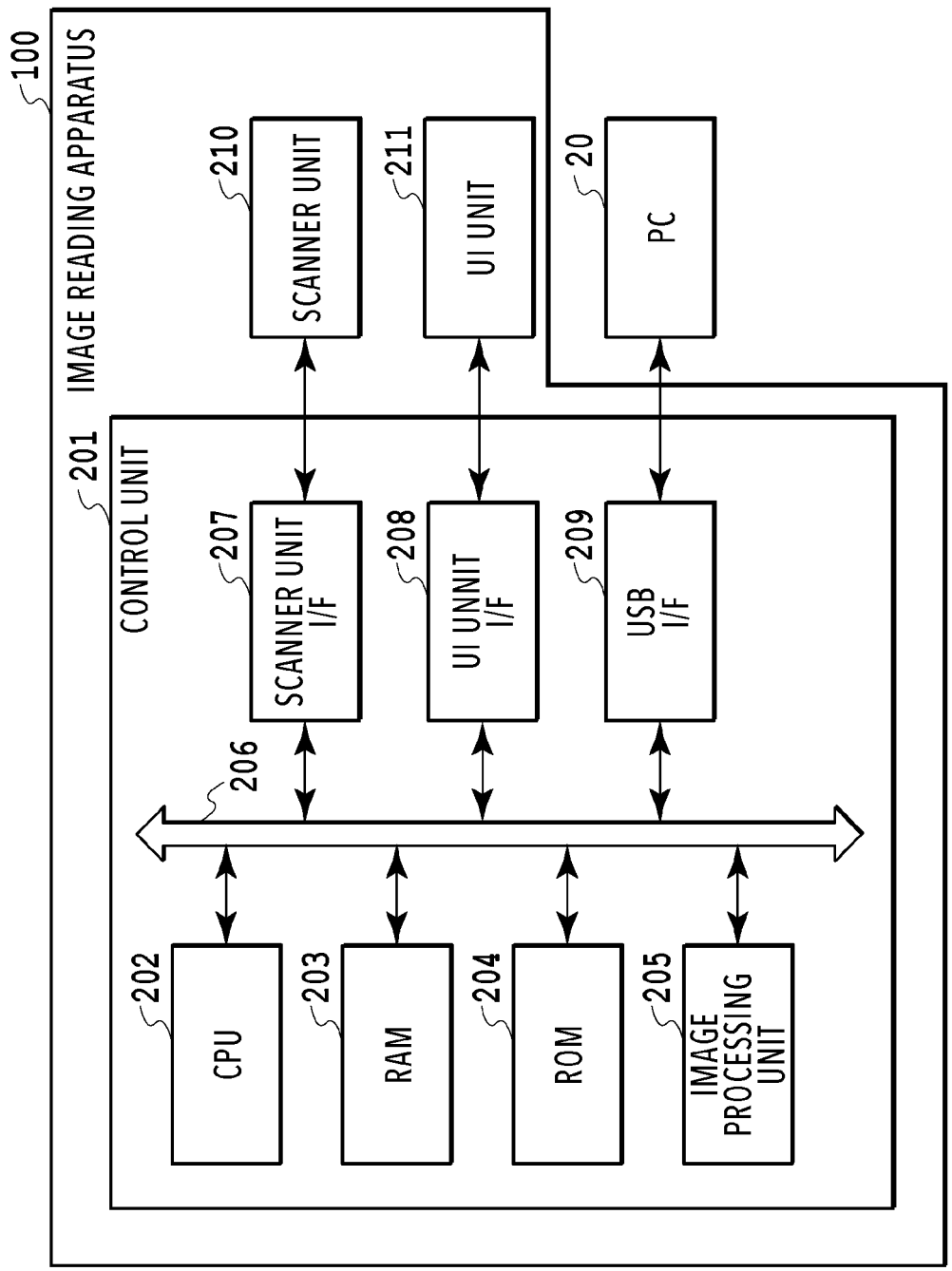
FIG. 2 is a block diagram illustrating the hardware configuration of the image reading apparatus in the first embodiment.

FIG. 2 is a block diagram illustrating the hardware configuration of the image reading apparatus 100 in the first embodiment. The image reading apparatus 100 has a control unit 201, a scanner unit 210, and a user interface (UI) unit 211. The control unit 201 controls the operation of the whole image reading apparatus 100. The control unit 201 includes a CPU 202, an RAM 203, an ROM 204, an image processing unit 205, a scanner unit I/F 207, a UI unit I/F 208, and a USB I/F 209. The units in the control unit 201 are connected to each other by a bus 206. The CPU 202 deploys control programs stored in the ROM 204 into the RAM 203 and performs various control processes by reading out those control programs as appropriate from the RAM 203. The RAM 203 is used as a work area and a temporary storage area for deploying the various programs stored in the ROM 204. The ROM 204 is a flash storage, for example, and stores image data, the various programs, and various pieces of setting information. Note that an auxiliary storage apparatus such as a hard disk drive may be used as the ROM 204. In the image reading apparatus 100 in the present embodiment, a single CPU 202 executes the processes illustrated in the later-described flowcharts by using a single memory (RAM 203). Alternatively, a plurality of CPUs and a plurality of RAMs, ROMs, and storages may operate in cooperation with each other to execute the process illustrated in the later-described flowchart. Also, a hardware circuit may be used to execute part of the process performed in the image reading apparatus 100. The scanner unit I/F 207 is an interface for connecting the scanner unit (also referred to as image reading unit) 210 and the control unit 201. The scanner unit 210 scans a document set on the document platen 101 and generates digital image data. The scanner unit 210 then transfers the generated digital image data to the RAM 203 of the control unit 201 through the scanner unit I/F 207. The UI unit I/F 208 is an interface for connecting the UI unit 211 and the control unit 201. The UI unit 211 comprises a liquid crystal display having a touchscreen function, operation keys, and so on and functions as a display unit that presents information to the user and a reception unit that receives instructions from the user. The USB I/F 209 controls USB communication with a personal computer (PC) 20 connected to the image reading apparatus 100. The PC 20 is an external apparatus capable of inputting a scan operation command to the image reading apparatus 100. Besides a PC, it is possible to use, for example, a smartphone, a tablet, a mobile phone, a PDA, or the like as the external apparatus. In a case where a scan operation command is inputted from the PC 20 through a USB cable, for example, the USB I/F 209 receives that input and stores the scan operation command in the RAM 203. The CPU 202 causes the scanner unit 210 to execute a scan operation through the scanner unit I/F 207 in accordance with the scan operation command stored in the RAM 203. The CPU 202 then temporarily stores the digital image data obtained by the scan operation in the RAM 203. The digital image data stored in the RAM 203 is transferred to the PC 20 through the USB I/F 209. As a result, an image based on the digital image data obtained by the scan operation can be displayed on a display unit included in the PC 20. After confirming that the digital image data has been transferred to the PC 20, the CPU 202 erases the digital image data stored in the RAM 203. After finishing both the transferring and erasing of the digital image data for the scan operation command, the CPU 202 terminates the scan operation of the scanner unit 210. The image processing unit 205 performs image processing or correction on the digital image data obtained by the scan operation. The image processing unit 205 is mainly used in a case where it is desired to use a hardware function to execute image processing or correction that would take time if executed with a control program deployed in the RAM 203.

Figure 3:
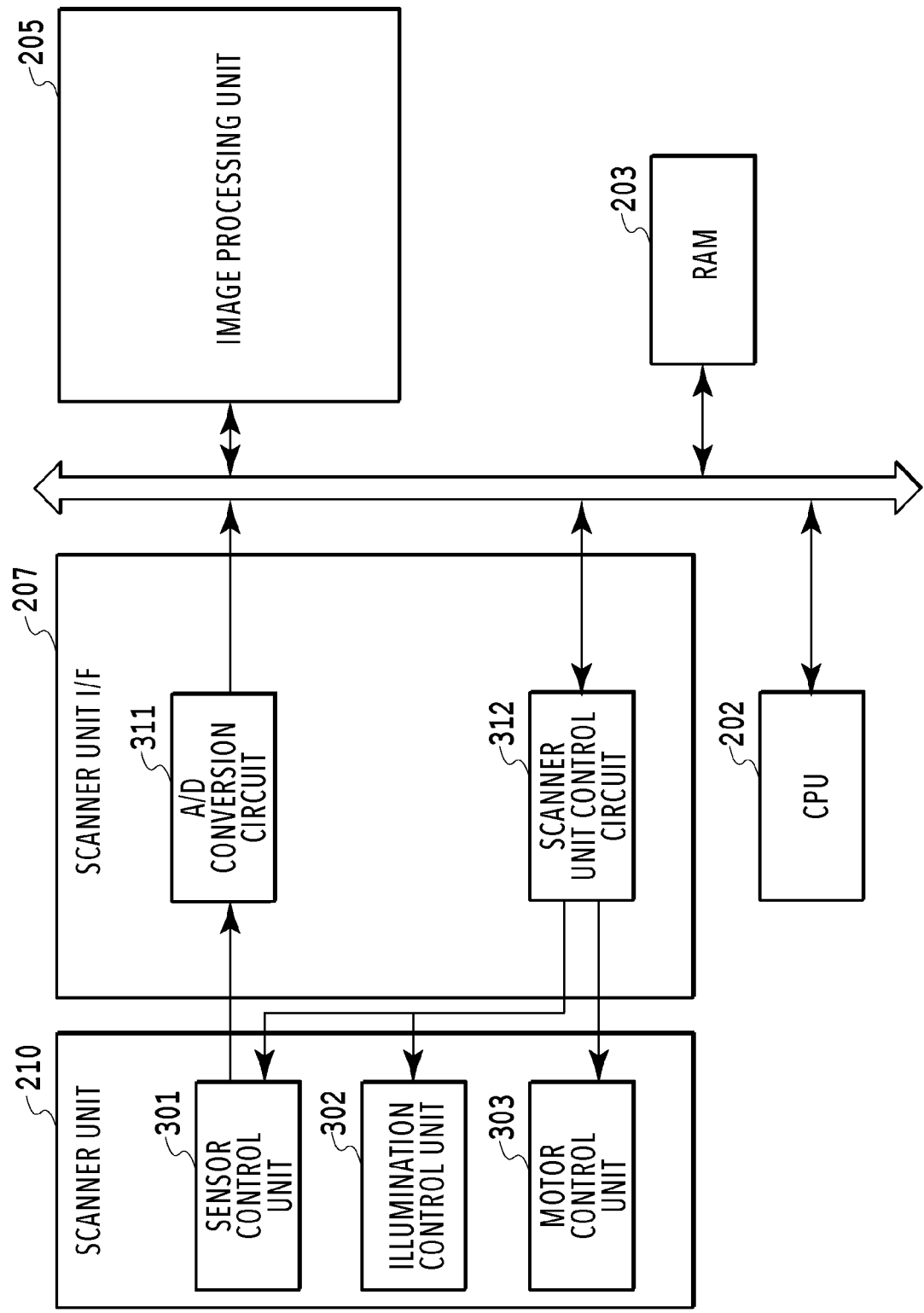
FIG. 3 is a block diagram illustrating the hardware configurations of units in the image reading apparatus related to scan operation.

Next, among the constituent elements of the image reading apparatus 100 illustrated in FIG. 2, the constituent elements involved in a scan operation will be described in detail. FIG. 3 is a block diagram illustrating the hardware configurations of the units in the image reading apparatus 100 involved in a scan operation. As illustrated in FIG. 3, the scanner unit 210 includes a sensor control unit 301, an illumination control unit 302, and a motor control unit 303. The scanner unit I/F 207 includes an A/D conversion circuit 311 and a scanner control circuit 312.

The sensor control unit 301 controls the operation of the image sensor array 113. The illumination control unit 302 controls the illumination of the light emitting unit 111. The motor control unit 303 controls a motor (not illustrated) for moving the CIS unit 110. Note that although a motor is used as an actuator in the present embodiment, an actuator other than a motor may be used instead.

The A/D conversion circuit 311 converts an analog signal obtained from the sensor control unit 301 into a digital signal. The scanner control circuit 312 controls the motor control unit 303 to drive the motor in accordance with an instruction from a later-described scanner control module 411.

Figure 4:
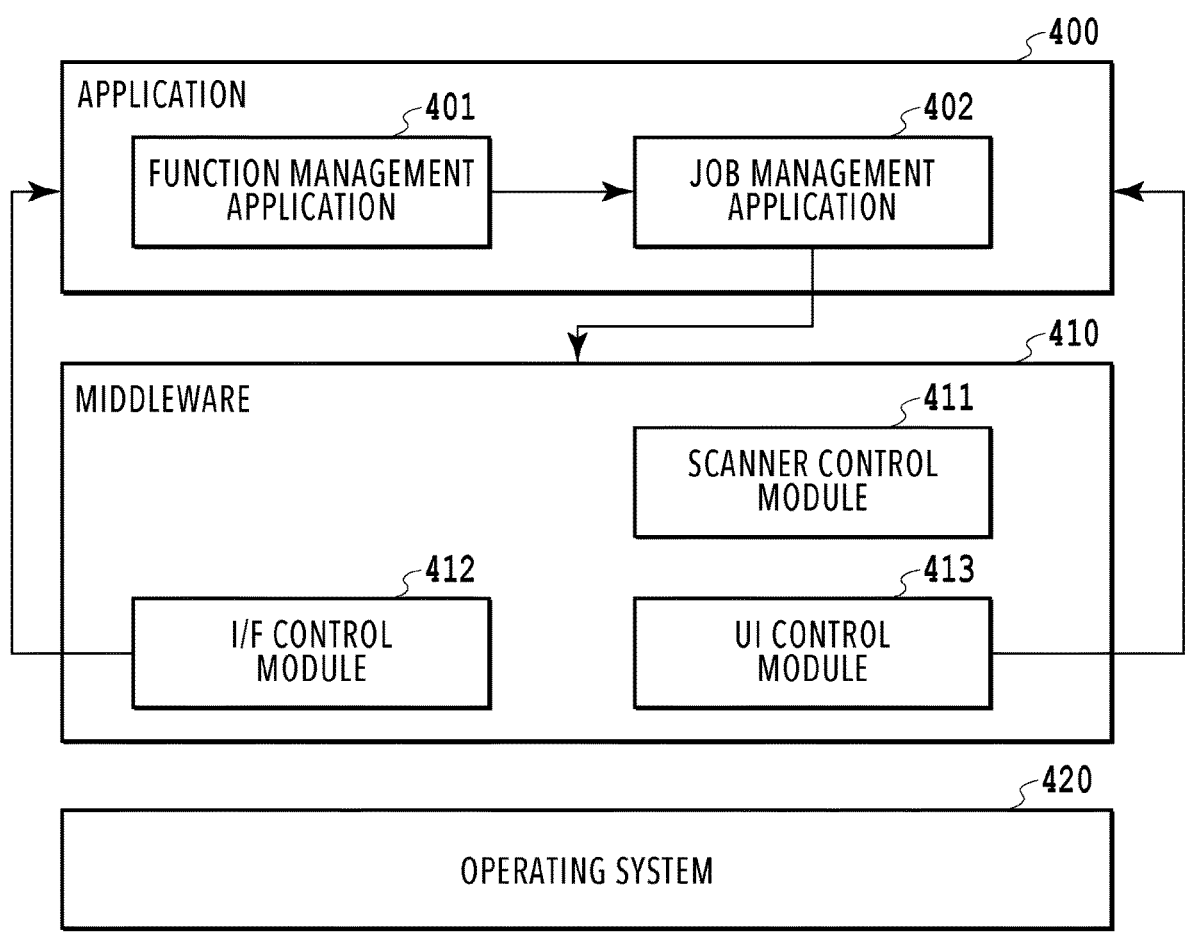
FIG. 4 is a block diagram illustrating the configurations of pieces of software that control constituent elements in the image reading apparatus.

Next, the software configuration of the image reading apparatus 100 will be described. FIG. 4 is a block diagram illustrating the configurations of pieces of software that control constituent elements in the image reading apparatus 100 (a control program deployed in the RAM 203). As illustrated in FIG. 4, the control program is roughly divided into three blocks, namely, an application 400, middleware 410, and an operating system (OS) 420.

The OS 420 provides fundamental functions for executing the control program in the control unit 201. The middleware 410 is formed of a group of pieces of software that control interfaces (I/Fs) with physical devices such as the scanner unit 210 and the UI unit 211. In the present embodiment, the middleware 410 has a scanner control module 411 that controls the scanner unit I/F 207, an I/F control module 412 that controls the USB I/F 209, and a UI control module 413 that controls the UI unit I/F 208. The application 400 is formed of a group of pieces of software that, through the modules in the middleware 410, operates the respective devices to implement various functions (such as a scanning function) which the image reading apparatus 100 provides to the user. For example, in a case where the user inputs information through the UI unit 211 and the UI unit I/F 208, the I/F control module 412 notifies the application 400 of that information. The application 400 analyzes the given information and, in a case where the information is a scan operation command, a function management application 401 issues a scan job to cause a job management application 402 to execute the job. In doing so, the job management application 402 causes the scanner unit 210 to execute a scan operation by using the scanner control module 411 in the middleware 410. In this scan operation, as mentioned above, the scanner control module 411 controls the motor control unit 303 through the scanner control circuit 312 to control movement of the CIS unit 110. The job management application 402 stores the digital image data obtained as the result of the scan operation in the RAM 203. Note that before the job management application 402 stores the digital image data in the RAM 203, the digital image data may need some image processing or correction, as mentioned above. In that case, the scanner control module 411 uses the image processing unit 205 to perform the necessary image processing or correction on the digital image data. After being stored in the RAM 203, the digital image data is transmitted to the PC 20 through the I/F control module 412. The modules implement the functions which the image reading apparatus 100 provides by operating in cooperation with each other as described above.

Here, a scan operation in the image reading apparatus 100 will be specifically described. As mentioned above, the image sensor array 113 is formed of a plurality of sensors, and the output of each sensor undergoes A/D conversion. The outputs (digital image data) per line in the main scanning direction (the direction in which the sensors are arrayed) are stored in the RAM 203. The number of outputs per line in the main scanning direction varies depending on the resolution specified by the job management application 402. After the range in which to perform a scan operation is specified, the scanner control module 411 firstly specifies the scan operation range for the image sensor array 113 in the main scanning direction. As a result, it is determined that the range of outputs to be used as scan image data among the outputs of the image sensor array 113 per line in the main scanning direction. The scanner control module 411 also specifies the scan operation range for the CIS unit 110 in the direction in which it is driven (sub scanning direction). As a result, how much the CIS unit 110 is to be moved in the drive direction is determined. In the scanner unit 210, upon receipt of a read command from the scanner control module 411 through the scanner unit I/F 207, the illumination control unit 302 illuminates the LED of the light emitting unit 111 and the motor control unit 303 moves the CIS unit 110. As a result, a document S set on the contact glass 130 (a document placed on the document platen) is scanned. In doing so, the illumination control unit 302 switches the color of illumination of the LED to red (R), green (G), and blue (B) in turn to turn the incident light to R, G, and B. Then, the incident light reflected by the document S is guided to the image sensor array 113 through the rod lens array 112, and an analog signal corresponding to the reflected light is inputted from the image sensor array 113 into the A/D conversion circuit 311 through the sensor control unit 301. The A/D conversion circuit 311 converts the inputted analog signal into a digital signal. As a result, outputs (digital image data) of the three colors are obtained. Further, the image processing unit 205 combines the pieces of digital image data of the three colors, so that color digital image data is obtained. Also, the image processing unit 205 performs image processing or correction on the digital image data if necessary. The scanner control module 411 stores the digital image data in the RAM 203. Digital image data of the document S set on the contact glass 130 is generated in this manner. After the scan operation on the document S is completed, the scanner control module 411 moves the CIS unit 110 to the home position for a scan operation on the next document. Note that in the present embodiment, the moving distance of the CIS unit 110 during a scan operation is detected, and the movement of the CIS unit 110 during the scan operation is controlled by an optical encoder (not illustrated) included in the image reading apparatus 100. Specifically, the timing to end the scan and the timing to reverse the movement of the CIS unit 110 are controlled on the basis of the moving distance of the CIS unit 110 during the scan operation detected by the optical encoder. Also, in the present embodiment, the optical encoder not only detects the moving distance of the CIS unit 110 during a scan operation but also detects a moving distance to be used in the error detection described below.

Figure 5:
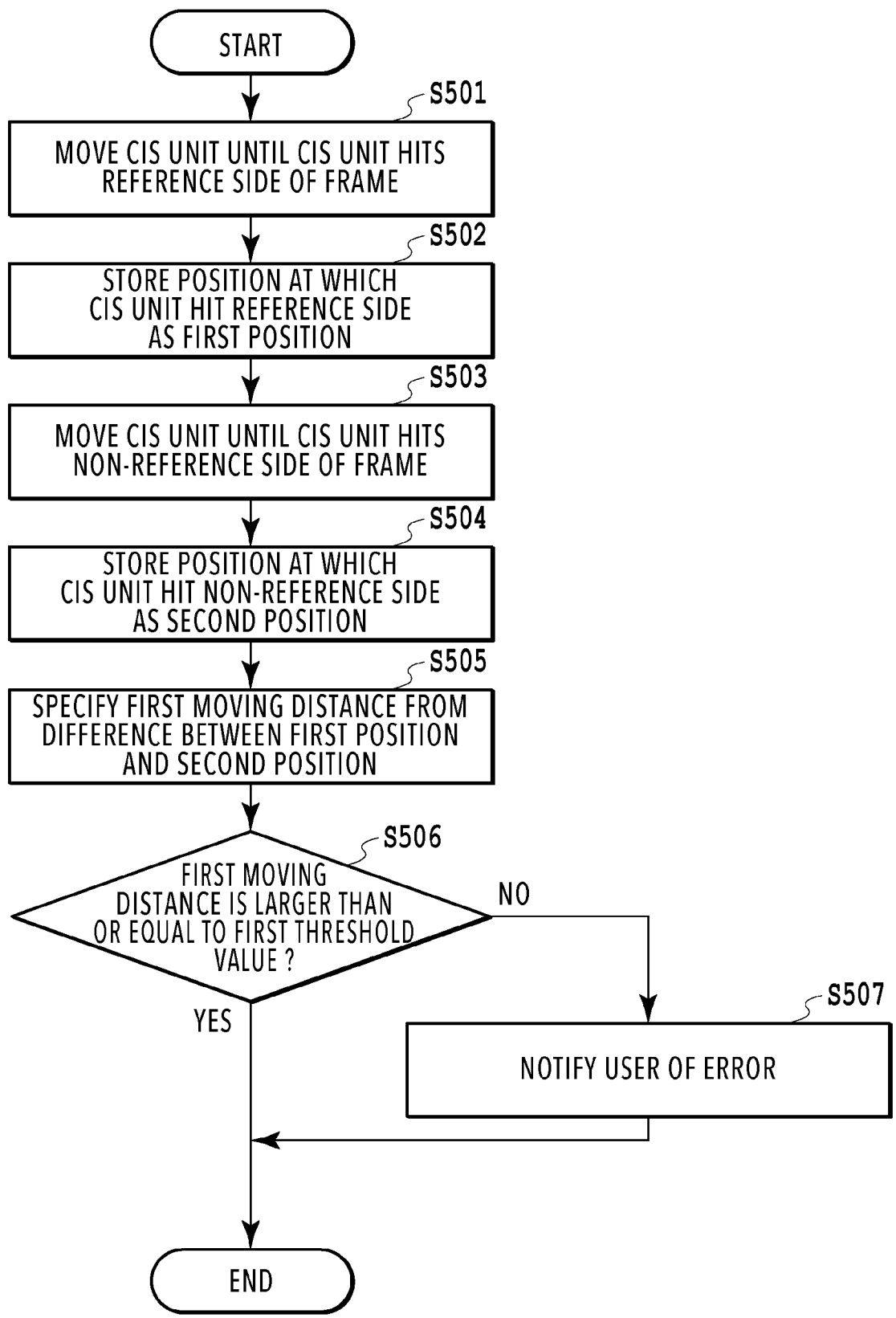
FIG. 5 is a flowchart illustrating a process of determining whether an error is occurring with a CIS unit in the first embodiment.

FIG. 5 is a flowchart illustrating a process of determining whether an error is occurring with the CIS unit 110 in the first embodiment (hereinafter referred to as "error determination process"). The CPU 202 implements the process illustrated in this flowchart by reading out a program stored in the ROM 204 or the like into the RAM 203 and executing it.

Upon supply of power to the control unit 201, the scanner control module 411 controls the motor control unit 303 to drive the motor, and executes control to move the CIS unit 110 toward the upstream side in the sub scanning direction (toward the left side in FIG. 1B) until the CIS unit 110 cannot move any farther. Specifically, the scanner control module 411 drives the motor control unit 303, which controls movement of the CIS unit 110, for a predetermined period (e.g., 500 msec). Thus, in a case where the CIS unit 110 is not fixed by the lock member 120 or the like, the CIS unit 110 hits the reference-side sidewall 160 of the frame and is located at the home position. In other words, in the present embodiment, the scanner control module 411 executes control to move the CIS unit 110 until it hits the reference-side sidewall 160 of the frame (S501). Meanwhile, the scanner control module 411 determines whether the CIS unit 110 has hit the reference-side sidewall of the frame 140 from the output of the optical encoder (not illustrated). In a case where the CIS unit 110 hits the reference-side sidewall, the scanner control module 411 stores the position obtained from the optical encoder as a first position in the RAM 203 (S502), and determines this position as the home position. Note that in a case where the CIS unit 110 becomes unable to advance toward the reference side before hitting the reference-side sidewall in S501, the position at this point is stored as the first position in the RAM 203. Specifically, in this case, the position of the CIS unit 110 at the timing when the CIS unit 110 becomes unable to advance toward the reference side is stored as the first position in the RAM 203. Note that the information stored as the first position in the above case may be a value related to the coordinate of the first position or a value related to the distance of the movement (moving distance) of the CIS unit 110 to the first position by the process in S501. Also, while the position of the CIS unit 110 is detected using an optical encoder in the present embodiment, the position may be detected by a different method.

Then, the scanner control module 411 controls the motor control unit 303 to drive the motor, and executes control to move the CIS unit 110 toward the downstream side in the sub scanning direction (toward the right side in FIG. 1B) until the CIS unit 110 cannot move any farther. Specifically, the scanner control module 411 drives the motor control unit 303 to the extent necessary for the CIS unit 110 to move a particular distance. Thus, in the case where the CIS unit 110 is not fixed by the lock member 120 or the like, the CIS unit 110 hits a non-reference-side (the right side in FIG. 1B) sidewall of the frame. In other words, in the present embodiment, the scanner control module 411 executes control to move the CIS unit 110 until it hits the non-reference-side sidewall of the frame (S503). In a case where the CIS unit 110 hits the non-reference-side sidewall, the scanner control module 411 stores the position obtained from the optical encoder as a second position in the RAM 203 (S504). Note that in a case where the CIS unit 110 becomes unable to advance toward the non-reference side before hitting the non-reference-side sidewall in S503, the position at this point is stored as the second position in the RAM 203. Specifically, in this case, the position of the CIS unit 110 at the timing when the CIS unit 110 becomes unable to advance toward the non-reference side is stored as the second position in the RAM 203. Note that the information stored as the second position in the above case may be a value related to the coordinate of the second position or a value related to the distance of the movement (moving distance) of the CIS unit 110 to the second position by the process in S503.

The scanner control module 411 specifies a first moving distance on the basis of the first position and the second position stored in the RAM 203 (S505). The first moving distance is equal to the distance between the position of the CIS unit 110 at the timing when the CIS unit 110 became unable to advance any farther toward the reference side in S501 and the position of the CIS unit 110 at the timing when the CIS unit 110 became unable to advance any farther toward the non-reference side in S503. The scanner control module 411 compares the first moving distance with a preset first threshold value (S506). If the first moving distance is larger than or equal to the first threshold value (YES in S506), the scanner control module 411 determines that the CIS unit 110 has been properly moved, and terminates the process. In the case where the CIS unit 110 has been properly moved, the scanner control module 411 moves the CIS unit 110 to the home position and waits until a scan operation command is inputted from the PC 20.

If the first moving distance is smaller than the first threshold value (NO in S506), it means either the CIS unit 110 could not be moved in S501 or S503 or the moving distance was short. In other words, it is highly likely that the lock member 120 has been inserted in the lock receiving hole 114 of the CIS unit 110, thereby fixing the CIS unit 110, before the supply of power to the control unit 201. Thus, the scanner control module 411 determines that an error occurred during the movement of the CIS unit 110, and executes a notification process of notifying the user of the error related to the CIS unit 110 (S507). Specifically, in the above case, the scanner control module 411 transmits notification information for notifying the user of the occurrence of the error related to the CIS unit 110 to the PC 20. As a result, a notification screen for notifying the user of the error related to the CIS unit 110 is displayed on the display unit of the PC 20. The notification screen may include a region indicating a method to solve the error, for example. Specifically, the notification screen may include a region that prompts the user to unfix the CIS unit 110 from the lock member 120. Meanwhile, the notification screen may be displayed on the UI unit 211. Also, the notification screen may be a screen for notifying the user that the CIS unit 110 is fixed by the lock member 120. In sum, it suffices in this notification process that a notification concerning the CIS unit 110 is made. Thereafter, the process terminates. The first threshold value is determined in advance on the basis of the size of the frame 140 (the size in the sub scanning direction).

As described above, in the present embodiment, upon supply of power to the control unit 201 of the image reading apparatus 100, it is determined whether an error is occurring with the CIS unit 110, and the user is notified of the result of the determination. Also, in the present embodiment, whether an error related to the CIS unit 110 is occurring is detected on the basis of the moving distance of the CIS unit 110 obtained from the encoder. The mechanism to detect the moving distance of the CIS unit 110 (the encoder in the present embodiment) is a component naturally included in the image reading apparatus, which reads a document by moving the CIS unit 110. For this reason, in the present embodiment, it is possible to detect whether an error related to the CIS unit 110 is occurring upon start of power supply without providing a special mechanism such as a photosensor inside the housing of the image reading apparatus 100, thereby lowering the development cost.

Meanwhile, in the present embodiment, whether the CIS unit 110 has been moved by a predetermined moving distance is detected, instead of simply detecting whether the CIS unit 110 has been moved. With the configuration that simply detects whether the CIS unit 110 has been moved, it is impossible to detect, for example, an error in which the CIS unit 110 becomes unable to move at a point along its movement path due to a foreign matter such as dust on the movement path although the CIS unit 110 has been unfixed from the lock member 120. In the present embodiment, it is possible to detect the above error by detecting whether the CIS unit 110 has been moved by a preset moving distance.

Second Embodiment

Figure 6:
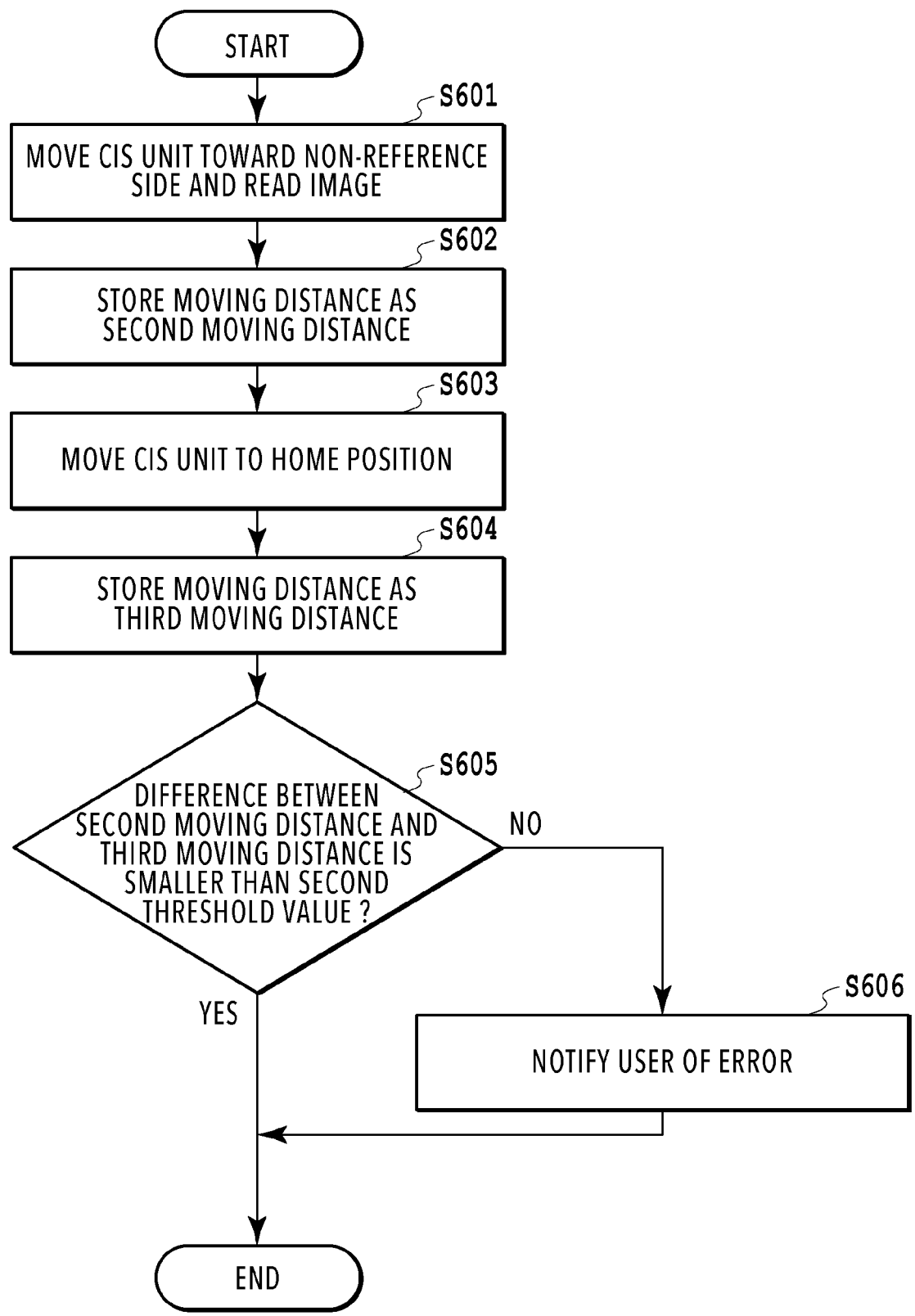
FIG. 6 is a flowchart illustrating a process of determining whether an error is occurring with a CIS unit in a second embodiment.

In the first embodiment, an image reading apparatus has been exemplarily described which determines whether an error is occurring upon supply of power to the control unit 201, and notifies the user of the result of the determination. In the present embodiment, an image reading apparatus will be described which determines whether an error is occurring on the basis of the moving distance of the CIS unit during a scan operation, and notifies the user of the result of the determination. Note that the configuration of the image reading apparatus in the second embodiment is similar to the configuration in the first embodiment, illustrated in FIGS. 1 to 4, and description thereof is therefore omitted. FIG. 6 is a flowchart illustrating the error determination process in the second embodiment. The CPU 202 implements the process illustrated in this flowchart by reading out a program stored in the ROM 204 or the like into the RAM 203 and executing it.

Upon receipt of a scan operation command from the PC 20, the scanner control module 411 executes control to perform a scan operation by moving the CIS unit 110 from the home position toward the non-reference-side sidewall in accordance with the scan operation command (S601). Specifically, the scanner control module 411 executes a scan operation by driving the motor control unit 303 so as to move the CIS unit 110 toward the non-reference-side sidewall. Thus, in the case where the CIS unit 110 is not fixed by the lock member 120 or the like, the CIS unit 110 moves across an appropriate reading range determined on the basis of the size of the document or the like. After finishing the scan operation, the scanner control module 411 stores the moving distance of the CIS unit 110 in the scan operation, i.e., the moving distance from the home position to the non-reference side, as a second moving distance in the RAM 203 (S602). Then, the scanner control module 411 executes control to move the CIS unit 110 to the home position from the position at which the scan operation ended (S603). Specifically, the scanner control module 411 drives the motor control unit 303 to the extent necessary for the CIS unit 110 to move to the home position from the position at which the scan operation ended, the extent being determined on the basis of the appropriate reading range. Thus, in the case where the CIS unit 110 is not fixed by the lock member 120 or the like, the CIS unit 110 moves to the home position. Then, the scanner control module 411 stores the moving distance of the CIS unit 110 in S603 as a third moving distance in the RAM 203 (S604). The scanner control module 411 specifies the difference between the second moving distance and the third moving distance, and checks whether the difference is smaller than a preset second threshold value (S605). If the difference between the second moving distance and the third moving distance is smaller than the preset second threshold value (YES in S605), the scanner control module 411 determines that the CIS unit 110 has been properly moved, and the process terminates. If the difference between the second moving distance and the third moving distance is larger than or equal to the second threshold value (NO in S605), the scanner control module 411 determines that an error occurred during the movement of the CIS unit 110, and notifies the user of the error (S606). Then the process terminates. Meanwhile, one of the causes for determining that the error occurred may be that the lock member 120 is shifted into the locking state in the scan operation, thereby stopping the CIS unit 110 from moving to the home position. Here, the locking state refers to a state where the lock member 120 projects upward (toward the upper side in FIG. 1B) from the bottom surface (the lower surface in FIG. 1B) of the frame 140. If the lock member 120 is shifted into the locking state while the CIS unit 110 is located on the non-reference side relative to the lock member 120, the reference-side side surface of the CIS unit 110 will come into contact with the lock member 120 on the way back to the home position. As a result, the CIS unit 110 fails to return to the home position. The second threshold value is determined in advance on the basis of the distance from the reference-side sidewall 160 of the frame 140 to the lock member 120.

As described above, in the present embodiment, whether an error is occurring with the CIS unit 110 is determined on the basis of the moving distance of the CIS unit during a scan operation, and the user is notified of the result of the determination. For this reason, in the present embodiment, it is possible to detect whether an error with the CIS unit 110 is occurring in executing a scan operation without providing a special mechanism such as a photosensor inside the housing of the image reading apparatus 100, thereby lowering the development cost.

Third Embodiment

Figure 7B:
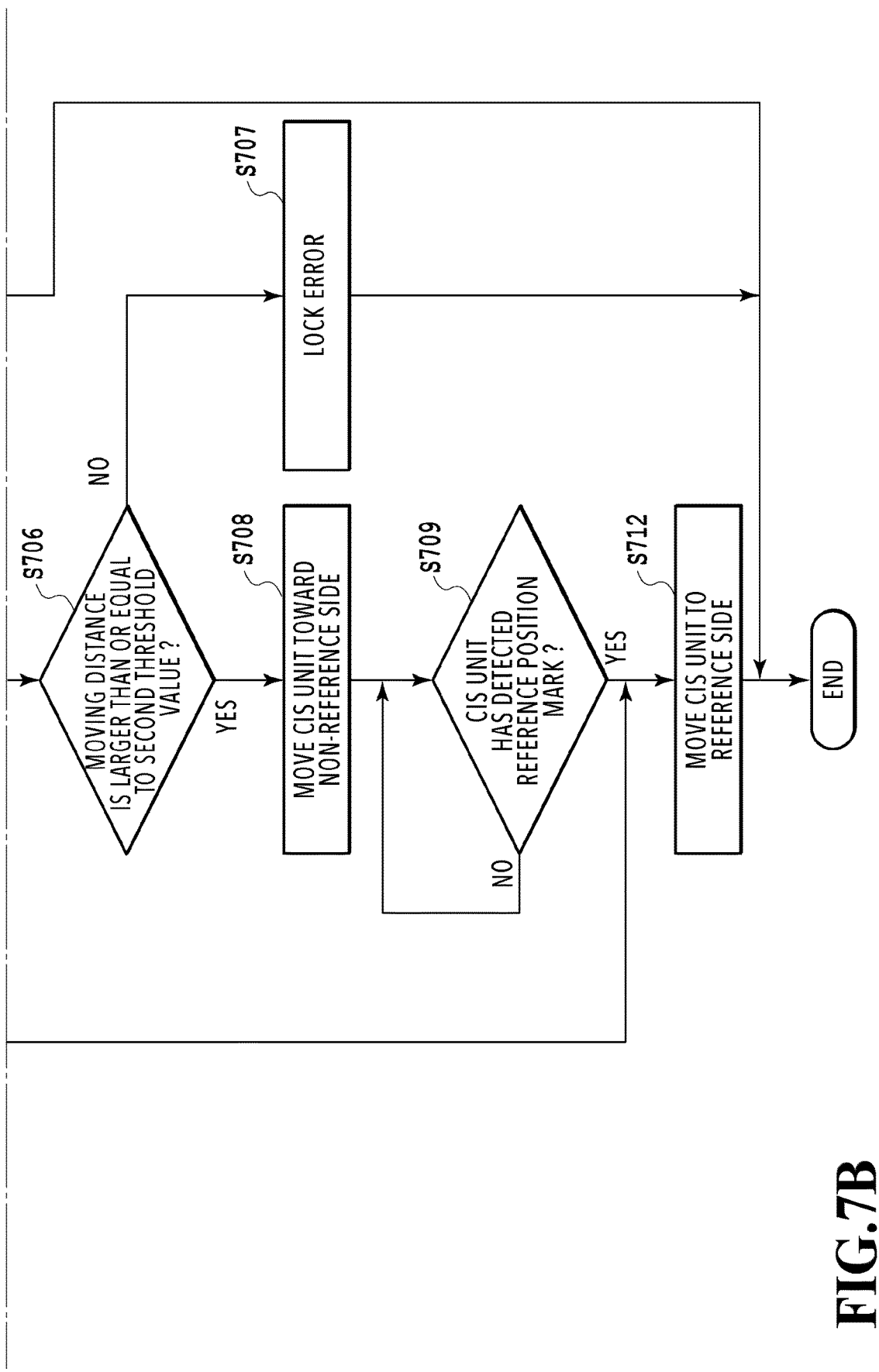
FIG. 7B is a flowchart illustrating a process of determining whether an error is occurring with a CIS unit in a third embodiment.

A description will be given of a method of determining whether an error is occurring on the basis of the moving distance of the CIS unit in a different manner from the first embodiment and the second embodiment. Note that the configuration of the image reading apparatus in the third embodiment is similar to the configuration in the first embodiment, illustrated in FIGS. 1 to 4, and description thereof is therefore omitted. FIG. 7 is a flowchart illustrating the error determination process in the third embodiment.

FIG. 7 is a flowchart illustrating the process of determining whether an error is occurring with the CIS unit 110 in the third embodiment. The CPU 202 implements the process illustrated in this flowchart by reading out a program stored in the ROM 204 or the like into the RAM 203 and executing it. Note that the process in the flowchart is started as the image reading apparatus 100 is powered on and the supply of power to the control unit 201 is started.

Upon supply of power to the control unit 201, in S701, it is determined whether the startup of the image reading apparatus 100 by the power-on this time is a normal startup or not (an abnormal startup). The normal startup refers to a startup after the image reading apparatus 100 is powered off in an idle state (a state of not executing a scan). If the startup of the image reading apparatus 100 by the power-on this time is a normal startup, the CIS unit 110 should be located at the home position and should not be fixed by the lock member 120. Thus, if the result of the above determination is YES, the processing advances to S710 and the later-described error detection is not performed. In contrast, the abnormal startup refers to a startup after the image reading apparatus 100 is powered off in a state of executing a scan or the first startup after the arrival of the image reading apparatus 100. If the startup of the image reading apparatus 100 by the power-on this time is an abnormal startup, it is likely that the CIS unit 110 is not located at the home position or fixed by the lock member 120. Thus, if the result of the above determination is NO, the processing advances to S702 and the error detection below is performed.

In S702, the scanner control module 411 controls the motor control unit 303 to drive the motor, and executes control to move the CIS unit 110 toward the upstream side in the sub scanning direction (toward the left side in FIG. 1B). Specifically, the scanner control module 411 drives the motor control unit 303, which controls movement of the CIS unit 110, for a predetermined period (e.g., 500 msec). Thus, in the case where the CIS unit 110 is not fixed by the lock member 120, the CIS unit 110 hits the reference-side sidewall 160 of the frame and is located at the home position. On the other hand, in the case where the CIS unit 110 is fixed by the lock member 120, the CIS unit 110 moves slightly. Also, in a case where the circuit for moving the CIS unit 110 has been damaged, the CIS unit 110 does not move at all. The moving distance of the CIS unit 110 in this step is detected by the optical encoder and stored in the RAM 203.

Thus, in S703, the scanner control module 411 determines whether or not the moving distance by which the CIS unit 110 was moved by the control in S702 (the moving distance detected by the optical encoder) is larger than or equal to a first threshold value (executes error detection). The first threshold value is smaller than the distance by which the CIS unit 110 is moved by the control in S702 in the case where the CIS unit 110 is fixed by the lock member 120, and larger than 0. Thus, the above control determines whether an error due to damage of the circuit for moving the CIS unit 110 is occurring. If the result of the above determination is YES, it means that the CIS unit 110 moved at least slightly, and the scanner control module 411 therefore determines that an error due to damage of the circuit for moving the CIS unit 110 has not occurred. Thus, the processing advances to S705. On the other hand, if the result of the above determination is NO, it means that the CIS unit 110 did not move even slightly, and the scanner control module 411 therefore determines that an error due to damage of the circuit for moving the CIS unit 110 is occurring. Thus, the processing advances to S704.

In S704, the scanner control module 411 executes an error notification process of notifying the user of the error related to the circuit for moving the CIS unit 110. Specifically, in doing so, the scanner control module 411 transmits notification information for notifying the user of the occurrence of the error related to the circuit for moving the CIS unit 110 to the PC 20. As a result, an error notification screen for notifying the user of the occurrence of the error related to the circuit for moving the CIS unit 110 is displayed on the display unit of the PC 20. Note that the error related to the circuit for moving the CIS unit 110 is specifically an error due to a mechanical failure of the motor for moving the CIS unit 110 or an electrical failure of a motor driver (corresponding to the motor control unit 303). Since it is difficult for the user to solve these errors, the error notification screen includes a region that prompts the user to call service staff. Meanwhile, the error notification screen may be displayed on the UI unit 211. Thereafter, the process ends.

In S705, the scanner control module 411 controls the motor control unit 303 to drive the motor, and executes control to move the CIS unit 110 toward the downstream side in the sub scanning direction (toward the right side in FIG. 1B). Specifically, the scanner control module 411 drives the motor control unit 303, which controls movement of the CIS unit 110, for a particular period (e.g., 500 msec). Thus, in the case where the CIS unit 110 is not fixed by the lock member 120, the CIS unit 110 moves normally. On the other hand, in the case where the CIS unit 110 is fixed by the lock member 120, the CIS unit 110 moves slightly (shorter than it normally moves). The moving distance of the CIS unit 110 in this step is detected by the optical encoder and stored in the RAM 203.

Thus, in S706, the scanner control module 411 determines whether or not the moving distance by which the CIS unit 110 was moved by the control in S705 (the moving distance detected by the optical encoder) is larger than or equal to a second threshold value (executes error detection). The second threshold value is smaller than the distance by which the CIS unit 110 is moved by the control in S705 in the case where the CIS unit 110 is not fixed by the lock member 120. Also, the second threshold value is larger than the distance by which the CIS unit 110 is moved by the control in S705 in the case where the CIS unit 110 is fixed by the lock member 120. Thus, the above control determines whether an error due to fixing of the CIS unit 110 by the lock member 120 is occurring. If the result of the above determination is YES, the processing advances to S708. If the result of the above determination is NO, the processing advances to S707.

In S707, the scanner control module 411 determines that an error occurred during the movement of the CIS unit 110, and notifies the user of the error related to the CIS unit 110. This process is similar to the process in S507. Thereafter, the process ends.

In S708, the scanner control module 411 controls the motor control unit 303 to drive the motor, and executes control to further move the CIS unit 110 toward the downstream side in the sub scanning direction (toward the right side in FIG. 1B).

In S709, the scanner control module 411 determines whether the CIS unit 110 has detected the reference position mark 170. If the result of the above determination is YES, the processing advances to S712. If the result of the above determination is NO, the CIS unit 110 continues to be moved until detecting the reference position mark 170, and the scanner control module 411 therefore executes S709 again.

A description will be given of the process in the case where the startup of the image reading apparatus 100 by the power-on this time is a normal startup. In S710, the scanner control module 411 controls the motor control unit 303 to drive the motor, and executes control to move the CIS unit 110 toward the downstream side in the sub scanning direction (toward the right side in FIG. 1B). In other words, at this point, the scanner control module 411 does not execute control to move the CIS unit 110 toward the upstream side in the sub scanning direction (the left side in FIG. 1B), unlike the process in the case where the startup of the image reading apparatus 100 by the power-on this time is determined to be an abnormal startup. This is because if the startup of the image reading apparatus 100 by the power-on this time is a normal startup, it is highly likely that the CIS unit 110 is located at the home position and cannot be moved any farther toward the upstream side in the sub scanning direction.

In S711, the scanner control module 411 determines whether the CIS unit 110 has detected the reference position mark 170. If the result of the above determination is YES, the processing advances to S712. If the result of the above determination is NO, the CIS unit 110 continues to be moved until detecting the reference position mark 170, and the scanner control module 411 therefore executes S711 again.

In S712, the scanner control module 411 controls the motor control unit 303 to drive the motor, and executes control to move the CIS unit 110 toward the upstream side in the sub scanning direction (toward the left side in FIG. 1B). As a result, the CIS unit 110 is located at the home position, and can execute a scan from the appropriate position in a case where a scan execution instruction is received later.

As described above, in the present embodiment, whether an error is occurring with the CIS unit 110 is determined before starting any scan operation, and the user is notified of the result of the determination. Also, according to the present embodiment, as in the first embodiment and the second embodiment, it is possible to detect whether an error with the CIS unit 110 is occurring without providing a special mechanism such as a photosensor inside the housing of the image reading apparatus, thereby lowering the development cost. Also, according to the present embodiment, it is possible to notify the user of the occurrence of an error due to forgetting to unlock the CIS unit (carriage) (carriage lock error) and avoid mixing up this error with other errors such as one due to a mechanical failure of the motor.

Note that in the present embodiment, a description has been given of a case where the process illustrated in FIG. 7 is executed upon supply of power to the control unit 201. However, the process illustrated in FIG. 7 may be executed with other timings. For example, the process illustrated in FIG. 7 may be executed upon input of a scan operation command from the PC 20.

Also, in the present embodiment, in the case where the result of the determination in S701 is NO, the scanner control module 411 executes both the control to move the CIS unit 110 toward the downstream side in the sub scanning direction (S702) and the control to move the CIS unit 110 toward the upstream side in the sub scanning direction (S705). However, the present embodiment is not limited to this manner. For example, the scanner control module 411 may move the CIS unit 110 only toward one of the two sides and execute error detection on the basis of that moving distance.

Also, in the present embodiment, the scanner control module 411 detects a circuit error (S703) on the basis of the moving distance by the control to move the CIS unit 110 toward the downstream side in the sub scanning direction (S702). Moreover, the scanner control module 411 detects a lock error (S706) on the basis of the moving distance by the control to move the CIS unit 110 toward the upstream side in the sub scanning direction (S705). However, the present embodiment is not limited to this manner. The scanner control module 411 may execute both the circuit error detection (S703) and the lock error detection (S706) on the basis of either the moving distance by the control in S702 or the moving by the control in S705.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-145422, filed Aug. 1, 2018, which is hereby incorporated by reference herein in its entirety.

What is claimed is:

1. An image reading apparatus comprising a sensor constructed to read a document on a document platen and a fixing member constructed to restrict movement of the sensor, wherein in a state in which the fixing member restricts the movement of the sensor, the sensor is switchable to a state in which the fixing member does not restrict the movement of the sensor in response to a user operation, the image reading apparatus further comprising:
   at least one processor; and
   a memory storing instructions to cause the at least one processor to function as:
   a control unit configured to perform predetermined control to move the sensor;
   a detection unit configured to detect a value corresponding to an actually moved moving distance of the sensor by the predetermined control; and
   a notification unit configured to execute a notification process for notifying a user that movement of the sensor is restricted by the fixing member based on detection of a detected value less than or equal to a predetermined threshold despite performance of the predetermined control.

2. The image reading apparatus according to claim 1, wherein the predetermined control is control to drive a motor for moving the sensor for a predetermined period.

3. The image reading apparatus according to claim 1, wherein
   the notification process is a process of transmitting notification information for notifying the user that movement of the sensor is restricted by the fixing member, wherein the notification information is transmitted to an external apparatus connected to the image reading apparatus, and
   in a case where the notification information is transmitted to the external apparatus, a notification screen for notifying the user that movement of the sensor is restricted by the fixing member is displayed on a display unit included in the external apparatus.

4. The image reading apparatus according to claim 1, wherein the notification process is a process of displaying a notification screen for notifying the user that movement of the sensor is restricted by the fixing member, wherein the notification screen is displayed on a display unit included in the image reading apparatus.

5. The image reading apparatus according to claim 1, wherein the instructions cause the at least one processor to further function as:
   an error determination unit configured to execute an error determination process of determining whether an error related to a controller configured to control movement of the sensor is occurring, wherein the error determination process uses the detected value as a basis for the error determination; and
   an error notification unit configured to, in a case where the error determination unit determines that the error related to the controller is occurring, execute an error notification process for notifying the user of the error related to the controller.

6. The image reading apparatus according to claim 5, wherein
   whether movement of the sensor is restricted by the fixing member is determined by comparing the detected value with the predetermined threshold value, and
   the error determination unit determines whether the error related to the controller is occurring by comparing the detected value with a particular threshold value smaller than the predetermined threshold value.

7. The image reading apparatus according to claim 5, wherein
   the error notification process is a process of transmitting notification information for notifying the user of the error related to the controller, wherein the notification information is transmitted to an external apparatus connected to the image reading apparatus, and
   in a case where the notification information is transmitted to the external apparatus, an error notification screen for notifying the user of the error related to the controller is displayed on a display unit included in the external apparatus.

8. The image reading apparatus according to claim 5, wherein the error notification process is a process of displaying an error notification screen for notifying the user of the error related to the controller, wherein the notification screen is displayed on a display unit included in the image reading apparatus.

9. The image reading apparatus according to claim 8, wherein the error notification screen includes a region for prompting a user to call service staff.

10. The image reading apparatus according to claim 1, wherein the instructions cause the at least one processor to further function as:
    a sensor control unit configured to perform particular control to move the sensor;
    a moving distance detection unit configured to detect the moving distance of the sensor by the particular control;
    an error determination unit configured to execute an error determination process of determining whether an error related to a controller configured to control movement of the sensor is occurring, wherein the error determination process uses the detected value as a basis for the error determination; and
    an error notification unit configured to, in a case where the error determination unit determines that the error related to the controller is occurring, execute an error notification process for notifying the user of the error related to the controller.

11. The image reading apparatus according to claim 10, wherein the predetermined control is control to move the sensor in a first direction, and the particular control is control to move the sensor in a second direction different from the first direction.

12. The image reading apparatus according to claim 10, wherein
    whether movement of the sensor is restricted by the fixing member is determined by comparing the detected value with the predetermined threshold value, and
    the error determination unit determines whether an error related to the controller is occurring by comparing the detected value with a particular threshold value smaller than the predetermined threshold value.

13. The image reading apparatus according to claim 1, wherein a determination process is executed upon powering on the image reading apparatus, the determination process being a process of determining, on a basis of the detected moving distance of the sensor by the predetermined control, whether movement of the sensor is less than or equal to the predetermined threshold.

14. The image reading apparatus according to claim 1, wherein
    a determination process is not executed in a case where the image reading apparatus is powered on after the image reading apparatus is powered off in a state of not executing a scan, the determination process being a process of determining, on a basis of the detected moving distance of the sensor by the predetermined control, whether movement of the sensor is less than or equal to the predetermined threshold; and
    the determination process is executed in a case where the image reading apparatus is powered on after the image reading apparatus is powered off in a state of executing a scan or in a case where the image reading apparatus is powered on for a first time after arrival of the image reading apparatus.

15. The image reading apparatus according to claim 1, wherein the value corresponding to the actual moving distance of the sensor by the predetermined control is detected by an encoder included in the image reading apparatus.

16. The image reading apparatus according to claim 15, wherein
    the encoder detects the moving distance of the sensor also during reading of the document by the sensor, and
    the sensor controls the reading of the document on a basis of the moving distance of the sensor detected during the reading of the document by the sensor.

17. The image reading apparatus according to claim 1, wherein the notification process is a notification process for prompting a user to unfix the sensor from the fixing member.

18. The image reading apparatus according to claim 1, wherein the notification process is a notification process for prompting a user to solve an error relating to restriction of movement of the sensor by the fixing member.

19. A control method of controlling an image reading apparatus, wherein the image reading apparatus comprises a sensor constructed to read a document on a document platen and a fixing member constructed to restrict movement of the sensor, wherein in a state in which the fixing member restricts the movement of the sensor, the sensor is switchable to a state in which the fixing member does not restrict the movement of the sensor in response to a user operation, wherein the control method comprises:

performing predetermined control to move the sensor;

detecting a value corresponding to an actually moved moving distance of the sensor by the predetermined control; and executing a notification process for notifying a user that movement of the sensor is restricted by the fixing member based on detection of a detected value less than or equal to a predetermined threshold despite performance of the predetermined control.

20. A non-transitory computer readable storage medium storing a program which causes a computer of an image reading apparatus to perform a control method, wherein the image reading apparatus comprises a sensor constructed to read a document on a document platen and a fixing member constructed to restrict movement of the sensor, wherein in a state in which the fixing member restricts the movement of the sensor, the sensor is switchable to a state in which the fixing member does not restrict the movement of the sensor in response to a user operation, wherein the control method comprises:

performing predetermined control to move the sensor;

detecting a value corresponding to an actually moved moving distance of the sensor by the predetermined control; and executing a notification process for notifying a user that movement of the sensor is restricted by the fixing member based on detection of a detected value less than or equal to a predetermined threshold despite performance of the predetermined control.

* * * * *